US012620389B2

(12) United States Patent
Hariri Nokob et al.

(10) Patent No.: US 12,620,389 B2
(45) Date of Patent: May 5, 2026

(54) PREDICTOR-CORRECTOR METHOD FOR INCLUDING SPEECH HINTS IN AUTOMATIC SPEECH RECOGNITION

(71) Applicant: Cisco Technology, Inc., San Jose, CA (US)

(72) Inventors: Mohamed Hariri Nokob, Milpitas, CA (US); Kareem Aladdin Nassar, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 188 days.

(21) Appl. No.: 18/524,771

(22) Filed: Nov. 30, 2023

(65) Prior Publication Data

US 2025/0182745 A1     Jun. 5, 2025

(51) Int. Cl.
*G10L 15/26*     (2006.01)
*G10L 15/08*     (2006.01)

(52) U.S. Cl.
CPC .............. *G10L 15/08* (2013.01); *G10L 15/26* (2013.01)

(58) Field of Classification Search
None
See application file for complete search history.

(56) References Cited

U.S. PATENT DOCUMENTS 9,934,775 B2 *   4/2018   Raitio ................. G10L 13/0335
10,839,792 B2 *   11/2020   Audhkhasi ............ G10L 15/063

| | | | |
|---|---|---|---|
| 11,010,550 B2 * | 5/2021 | Bellegarda ............. | G06N 3/045 |
| 11,158,307 B1 | 10/2021 | Ghias et al. | |
| 11,688,394 B1 * | 6/2023 | Filimonov ........... | G06N 3/0455 |
| | | | 704/231 |
| 2003/0061046 A1 * | 3/2003 | Zhao ..................... | G10L 15/193 |
| | | | 704/E15.022 |
| 2003/0187643 A1 * | 10/2003 | Van Thong ............. | G10L 15/08 |
| | | | 704/254 |
| 2019/0279614 A1 * | 9/2019 | Ye .......................... | G10L 15/187 |
| 2020/0251096 A1 * | 8/2020 | Audhkhasi ............. | G06N 3/084 |
| 2021/0074262 A1 | 3/2021 | Duong et al. | |
| 2021/0142789 A1 | 5/2021 | Gurbani et al. | |
| 2022/0310067 A1 * | 9/2022 | Huang ..................... | G06N 3/04 |

(Continued)

OTHER PUBLICATIONS

Jain M., et al., "Contextual RNN-T for Open Domain ASR", arXiv:2006.03411v2 [eess.AS], Aug. 12, 2020, 5 Pages.

(Continued)

*Primary Examiner* — Neeraj Sharma
(74) *Attorney, Agent, or Firm* — Edell, Shapiro & Finnan, LLC

(57) ABSTRACT

A method comprises: receiving an automatic speech recognition (ASR) text transcript generated by an ASR process that encoded input audio into audio encodings and converted the audio encodings to ASR words of the ASR text transcript that correspond to the audio encodings; receiving speech hints for non-standard words, and generating alternative words for an ASR word of the ASR words based on the speech hints; correlating an audio encoding of the audio encodings that corresponds to the ASR word against the ASR word and each of the alternative words, to produce correspondence scores; selecting an output word among the ASR word and the alternative words based on the correspondence scores; and providing the output word to a corrected transcript.

20 Claims, 6 Drawing Sheets

100

(56) References Cited

U.S. PATENT DOCUMENTS

| | | | |
|---|---|---|---|
| 2022/0310072 A1 | 9/2022 | Sainath et al. | |
| 2022/0343913 A1* | 10/2022 | Yadav | G10L 15/26 |
| 2022/0415314 A1 | 12/2022 | Wang et al. | |
| 2023/0245649 A1* | 8/2023 | Singh | G10L 15/02 |
| | | | 704/9 |
| 2024/0013777 A1* | 1/2024 | Lu | G10L 15/16 |
| 2024/0029720 A1* | 1/2024 | Qiu | G10L 15/22 |

OTHER PUBLICATIONS

Paling A., "How Does an ASR System Handle Never-Before-Seen Words?", Towards Data Science, Medium, May 29, 2021, 11 Pages.
Sathyendra K.M., et al., "Contextual Adapters for Personalized Speech Recognition in Neural Transducers", arXiv:2205.13660v1 [cs.CL], May 26, 2022, 5 Pages.
Zhao D., et al., "Shallow-Fusion End-to-End Contextual Biasing", Interspeech 2019, Sep. 15-19, 2019, Graz, Austria, 5 pages.

* cited by examiner

Figure 1:
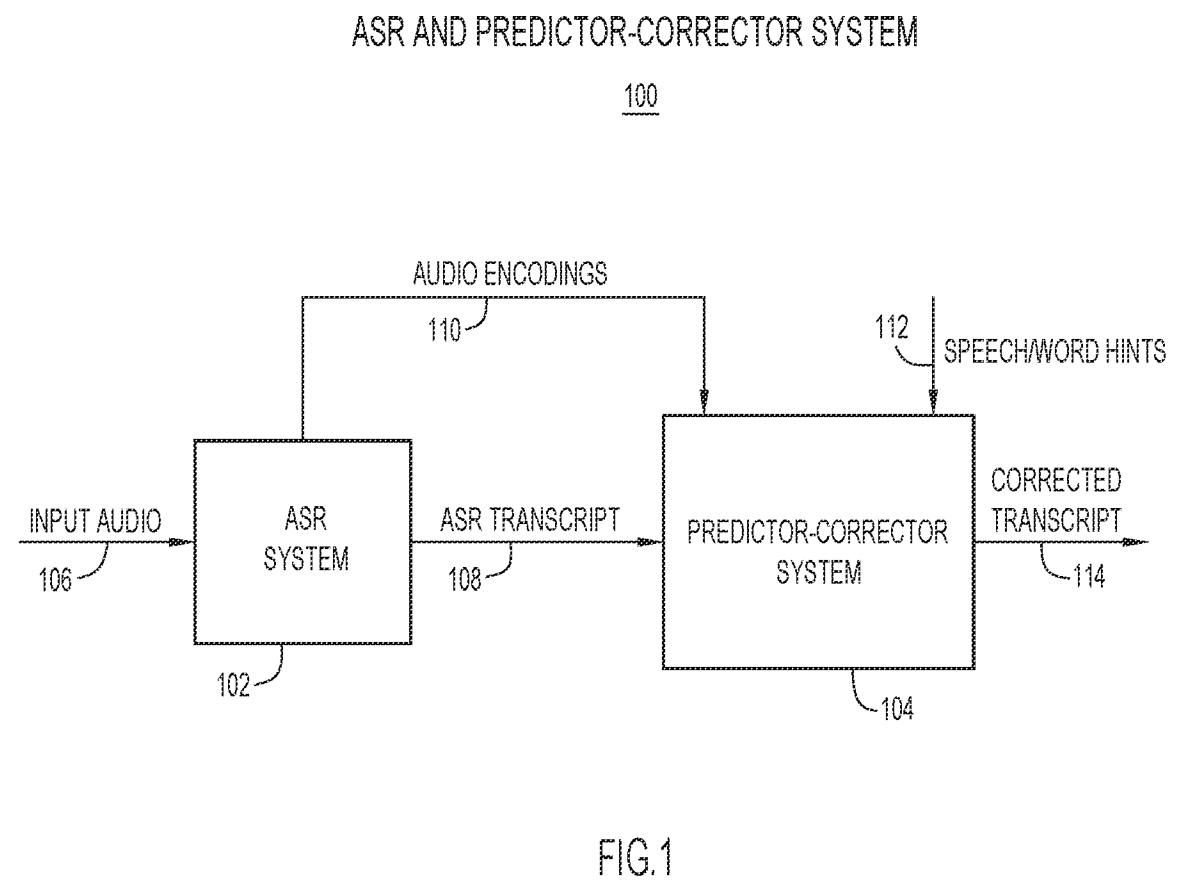

ASR AND PREDICTOR-CORRECTOR SYSTEM

100

SPEECH/WORD HINTS

112

CORRECTED
TRANSCRIPT

114

AUDIO ENCODINGS

110

PREDICTOR-CORRECTOR
SYSTEM

104

ASR TRANSCRIPT

108

ASR
SYSTEM

102

INPUT AUDIO

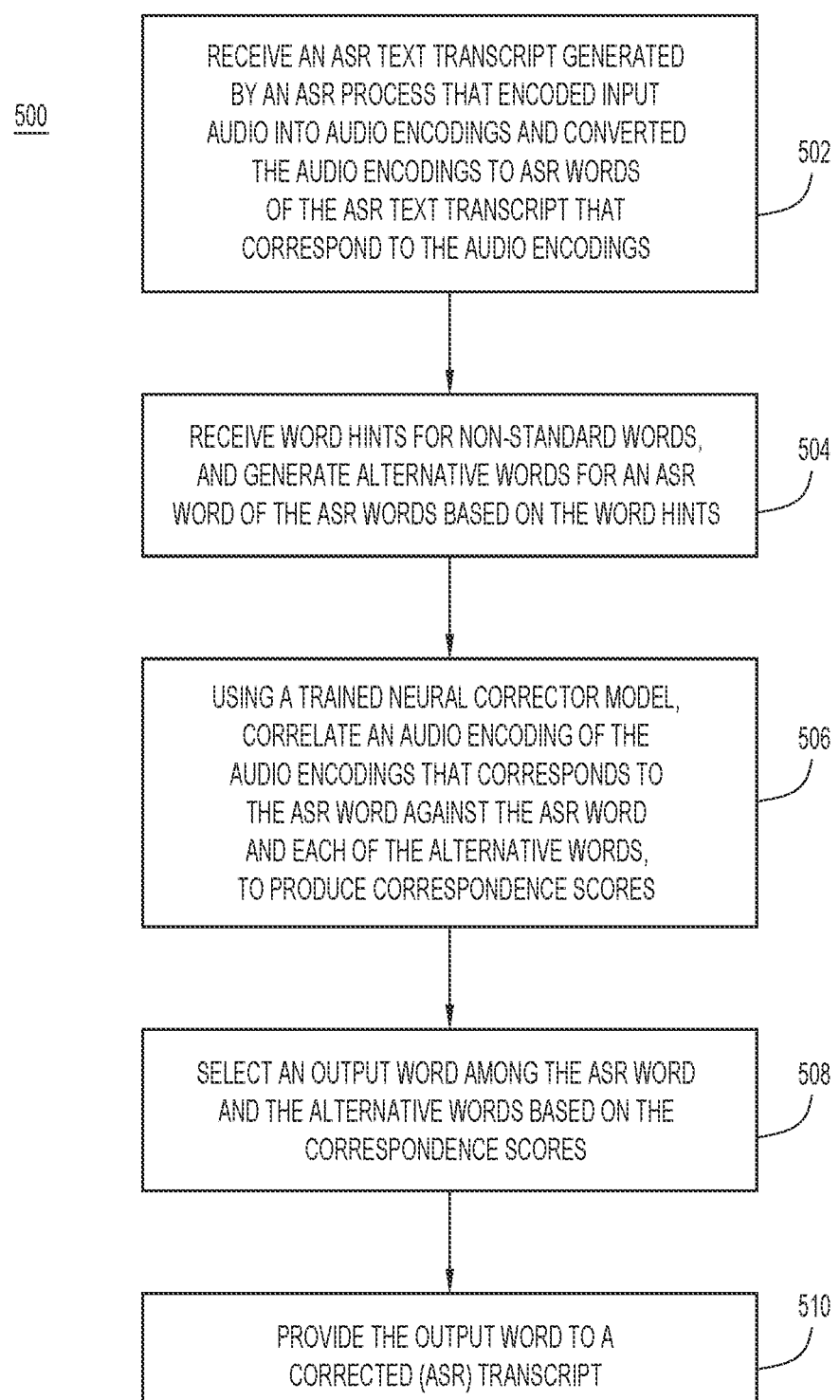

500

RECEIVE AN ASR TEXT TRANSCRIPT GENERATED
BY AN ASR PROCESS THAT ENCODED INPUT
AUDIO INTO AUDIO ENCODINGS AND CONVERTED
THE AUDIO ENCODINGS TO ASR WORDS
OF THE ASR TEXT TRANSCRIPT THAT
CORRESPOND TO THE AUDIO ENCODINGS

502

RECEIVE WORD HINTS FOR NON-STANDARD WORDS,
AND GENERATE ALTERNATIVE WORDS FOR AN ASR
WORD OF THE ASR WORDS BASED ON THE WORD HINTS

504

USING A TRAINED NEURAL CORRECTOR MODEL,
CORRELATE AN AUDIO ENCODING OF THE
AUDIO ENCODINGS THAT CORRESPONDS TO
THE ASR WORD AGAINST THE ASR WORD
AND EACH OF THE ALTERNATIVE WORDS,
TO PRODUCE CORRESPONDENCE SCORES

506

SELECT AN OUTPUT WORD AMONG THE ASR WORD
AND THE ALTERNATIVE WORDS BASED ON THE
CORRESPONDENCE SCORES

508

PROVIDE THE OUTPUT WORD TO A
CORRECTED (ASR) TRANSCRIPT

PREDICTOR-CORRECTOR METHOD FOR INCLUDING SPEECH HINTS IN AUTOMATIC SPEECH RECOGNITION

TECHNICAL FIELD

The present disclosure relates generally to improving automatic speech recognition (ASR) transcripts using speech hints and artificial intelligence (AI) techniques.

BACKGROUND

Automatic speech recognition (ASR) systems have become more accurate in recent years due to availability of large training datasets used to train ASR models employed by the ASR systems. A problem facing the ASR systems is their ineffectiveness when dealing with unseen words. Usually, names, acronyms, initialisms, and the like, do not appear in the training datasets, and thus present a challenge to the ASR systems. To help manage such challenges, speech hints may be passed to the ASR system as arguments, prior to transcription. Speech hints are special words such as names, acronyms, or domain specific words that are provided by a user, for example. Several methods have been proposed to enhance the ASR processing using speech hints, leading to unsatisfactory results in practical cases.

Typically, adding new words to a dictionary of so called "end-to-end ASR models" (e.g., neural networks trained wholly using text and audio as opposed to traditional models which consist of separate parts stitched together) is not natural because training adjusts ASR model weights to the general vocabulary without regard to additional out-of-vocabulary (OOV) words. Whatever method is used to add speech hints, the method can be suboptimal and likely produces a tradeoff between recall and precision for the speech hints as well as possible degradation in general word error rate.

BRIEF DESCRIPTION OF THE DRAWINGS

FIG. 1 is a block diagram of an automatic speech recognition (ASR) and predictor-corrector system in which embodiments directed to improving ASR transcripts using speech hints and audio encodings generated by ASR may be implemented, according to an example embodiment.

FIG. 5 is a flowchart of a method of improving an ASR transcript previously generated by ASR using speech hints and the neural corrector model to produce a corrected transcript, according to an example embodiment.

DETAILED DESCRIPTION

Overview

Figure 2:
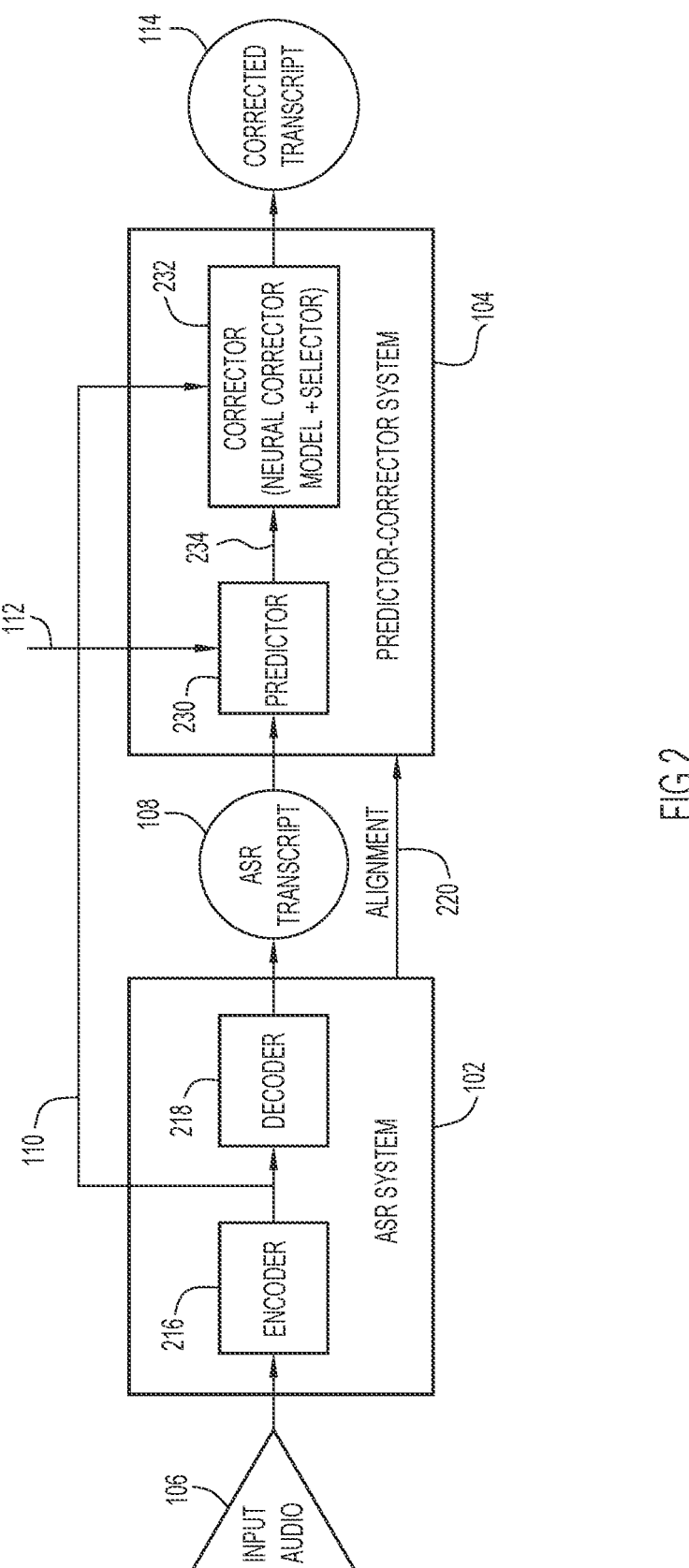
FIG. 2 is a block diagram expanding on the ASR and predictor-corrector system, according to an example embodiment.

In an embodiment, a method comprises: receiving an automatic speech recognition (ASR) text transcript generated by an ASR process that encoded input audio into audio encodings and converted the audio encodings to ASR words of the ASR text transcript that correspond to the audio encodings; receiving speech hints for non-standard words, and generating alternative words for an ASR word of the ASR words based on the speech hints; correlating an audio encoding of the audio encodings that corresponds to the ASR word against the ASR word and each of the alternative words, to produce correspondence scores; selecting an output word among the ASR word and the alternative words based on the correspondence scores; and providing the output word to a corrected transcript.

Example Embodiments

List of Definitions and Acronyms

Tokens: Pieces of words. For example, the word "Kyra" comprises two tokens "ky" and "ra."

General vocabulary words: Words that normally appear in text, including dictionary words.

OOV words: Out-of-vocabulary words that are not general vocabulary words and may be represented by speech hints.

FIG. 1 is a block diagram of an example automatic speech recognition (ASR) and predictor-corrector system 100 in which embodiments directed to improving ASR transcripts using speech hints (also referred to as "word hints") and audio encodings generated by ASR may be implemented. ASR and predictor-corrector system 100 includes an ASR system 102 followed by a predictor-corrector system 104. In an example, ASR system 102 and predictor-corrector system 104 may include computer processes or applications hosted on one or more computer devices.

ASR system 102 receives input audio 106 including a sequence of audio frames (e.g., a wave file), coverts the sequence of audio frames to an ASR transcript 108 including sentences of general vocabulary words, and provides the ASR transcript to predictor-corrector system 104. Internally, ASR system 102 generates audio encodings 110 (also referred to as "ASR encodings") of the audio frames as an intermediate signal, and provides the audio encodings to predictor-corrector system 104.

According to embodiments presented herein, predictor-corrector system 104 receives ASR transcript 108 (after being generated by ASR system 102), audio encodings 110 used to generate the ASR transcript, and speech hints 112 that represent OOV words (i.e., non-standard words) provided by an external source (e.g., a user generated file), and corrects/improves the ASR transcript based on the audio encodings and the speech hints, to produce a corrected transcript 114 (also referred to as a "corrected ASR transcript"). That is, predictor-corrector system 104 performs post-processing on ASR transcript 108 based on the speech hints and audio encodings 110 used previously to generate the ASR transcript. Corrected transcript 114 includes corrected or improved sentences of words of input audio 106 that reflect the speech hints.

FIG. 1 shows ASR system 102 and predictor-corrector system 104 as a combined system by way of example only. In another example, ASR system 102 and predictor-corrector system 104 may be separate systems that operate independently of each other and at different times. For example, at a first time, ASR system 102 may generate ASR transcript 108, audio encodings 110, and alignment signals (shown in FIG. 2), and then store the same (or representations thereof) to a data file. Then, at a second time after the first time, predictor-corrector system 104 may access the data file to generate corrected transcript 114 based on information in the data file. In an example, ASR system 102 and predictor-corrector system 104 may reside in respective endpoint devices connected to a network (e.g., the Internet) and communicate with each other over the network.

FIG. 2 is a block diagram expanding on each of ASR system 102 and predictor-corrector system 104, according to an embodiment. As shown, ASR system 102 includes an audio encoder 216 followed by an audio decoder 218. In one example, audio encoder 216 generates audio spectrograms (e.g., amplitude vs. frequency graphs) of the audio frames of input audio 106, extracts signal features from the spectrograms, and encodes/compresses the signal features into audio encodings 110 that correspond to the audio frames/ spectrograms. Audio encodings 110 may include audio/ speech vectors or tensors that represent the features of the spectrograms in compressed form, as is known. Audio encoder 216 may employ any known or hereafter developed audio encoding techniques used to produce audio encodings for ASR. Audio encoder 216 provides audio encodings 110 to audio decoder 218.

Audio decoder 218 decodes or converts audio encodings 110 to ASR words of ASR transcript 108. The ASR words each comprises a sequence of word pieces or ASR tokens. For example, each ASR word may comprise a respective sequence of ASR tokens (also referred to as an "ASR token sequence"). Audio decoder 218 may employ any known or hereafter developed audio decoding techniques used for ASR. ASR token sequences generated by audio decoder 218 from/based on audio encodings 110 are said to correspond to the audio encodings. For example, when audio encoder 216 encodes an audio frame into an audio encoding, and audio decoder 218 converts the audio encoding to an ASR word (or ASR token(s)), the audio encoding is said to correspond to the ASR word (or ASR token(s)).

Audio encoder 216 and audio decoder 218 generate/share alignment signals 220 that tag corresponding ones of audio encodings 110 and the ASR words (i.e., the ASR token sequences) of ASR transcript 108. In FIG. 2, audio encodings 110 and alignment signals 220 are depicted as being separate signals for descriptive clarity. In practice, however, audio encodings 110 and alignment signals 220 may be integrated/coupled together into a combined signal (e.g., via tagging of the audio encodings with the alignment signal). Alignment signals 220 synchronize/align the audio encodings and the ASR words, and indicate which of the audio encodings and the ASR words correspond to one another, e.g., are time aligned to each other. Alignment signals 220 may include timestamps, sequentially increasing numerical labels, and the like. ASR system 102 provides alignment signals 220 to predictor-corrector system 104 along with ASR transcript 108.

Predictor-corrector system 104 includes a predictor 230 followed by a corrector 232, which includes a neural corrector model and a selector, as will be described below in connection with FIG. 3. Predictor-corrector system 104 performs post-processing on previously generated ASR transcript 108 to improve/correct the ASR transcript. Predictor 230 receives ASR transcript 108 and speech hints 112 and generates alterative words (also referred to as "predictor alternatives") for/corresponding to the ASR words in the ASR transcript based on the speech hints. For example, predictor 230 examines sentences of ASR transcript 108 word-by-word, and generates a list of alternative words for various ones of the ASR words based on the speech hints. Generally, predictor 230 generates alternative words for some, but not all, of the ASR words. In this way, predictor 230 converts the sentence of ASR words to a sentence of ASR words associated with their alternative word lists. Predictor 230 operates/acts on token sequences to generate the alternative words. For example, predictor 230 parses the ASR words of ASR transcript 108 to access their corresponding ASR token sequences, and examines speech hints as hint token sequences (i.e., sequences of hint tokens). Predictor 230 determines whether one or more (e.g., a combination) of the ASR tokens of an ASR word can be replaced by one or more (e.g., a combination) of the hint tokens of a speech hint. For example, predictor 230 examines the structure and content of the ASR tokens, determines hint tokens that are similar to the ASR tokens, and replaces the ASR tokens with the similar hint tokens.

In principle, any number of ASR tokens can be replaced by any number of hint tokens, but practically that number may be limited to avoid spurious predictions. Multiple speech hints can be suggested for each token combination or none at all. In another example, ASR tokens of an ASR word may be replaced by tokens that are commonly mistaken with the ASR tokens (e.g., based on statistical analysis), as well as adding or removing tokens when such manipulation leads to a candidate from the list of speech hints. In another pass, predictor 230 examines speech hints that have a similar alignment of tokens/characters to the ASR word (e.g., as measured by a token/character error rate, respectively).

Thus, predictor 230 manipulates the ASR tokens of the ASR word based on hint tokens to generate the alternative words for the ASR word. Such token-level operations/ manipulations may follow the following predictor model: ASR word (ASR tokens)→predictor (i.e., alterative) word (hint tokens). Example token-level operations that follow the predictor model are shown below:

a. "Keira" (_kei ra)→"Kyra" (_ky ra). The speech hint is "Kyra," thus predictor 230 replaces/substitutes first ASR token "kei" with first hint token "Ky." The underscores indicate the start of a new word.

b. "Deer born" (_de er_bo rn)→"Dearborn" (_de ar bo r n), which makes three substitutions and one insertion to reach a speech hint. Here two words from the ASR were combined into one candidate word.

Predictor 230 may perform the above-described token-level operations using heuristic techniques based on example data or a statistical model (such as neural networks) trained on data using machine learning methods. Predictor 230 provides to corrector 232 a sequence of ASR words (represented as ASR token sequences) with alternative words for those of the ASR words for which the alternative words exist. The ASR words and their alternative words collectively represent word choices 234 that correspond to the ASR word.

Corrector 232 receives word choices 234 from predictor 230, audio encodings 110 from ASR system 102, and alignment signals 220. On an ASR word-by-ASR word basis (i.e., for each ASR word), corrector 232 determines an output word from word choices 234 based on audio encodings 110 using techniques described below in connection with FIG. 3. In some cases, corrector 232 may select an (original) ASR word as the output word. In other cases, corrector 232 may select an alternative word generated by predictor 230 for the (original) ASR word as the output word. Corrector 232 provides/writes the output word to corrected transcript 114, and repeats the process for a next ASR word until ASR transcript 108 is exhausted.

Figure 3:
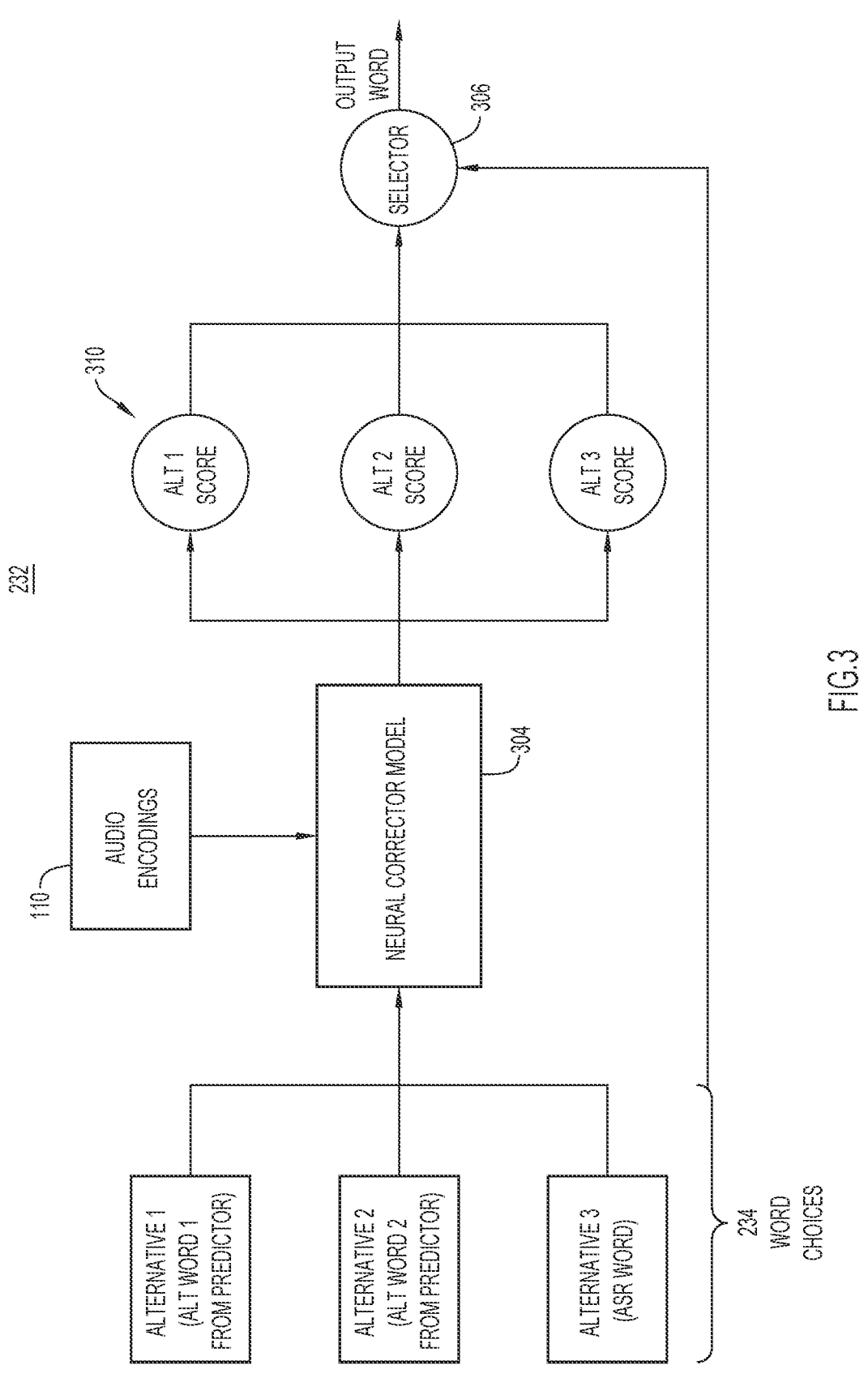
FIG. 3 is a block diagram expanding on a corrector of the ASR and predictor-corrector system, according to an example embodiment.

FIG. 3 is a block diagram expanding on corrector 232, according to an embodiment. Corrector 232 includes a neural corrector model 304 (also referred to as an artificial intelligence (AI) corrector model and a machine learning (ML) corrector model) followed by a selector 306. Neural corrector model 304 may be composed of convolutional, recurrent, attentional, pooling, or fully connected neural layers as well as any suitable nonlinearities and normalizations. Neural corrector model 304 is pre-trained on training data using neural networks/machine learning techniques. The training data may include audio encodings and token sequences. An example training technique used to train neural corrector model 304 is described below in connection with FIG. 4.

As shown by way of example, once trained, during inference-stage operation, neural corrector model 304 receives (from predictor 230) word choices 234 (also generally referred to as "alternatives") for/corresponding to an ASR word, including:

a. Alternative 1=Alternative word 1 generated by the predictor for an ASR word.

b. Alternative 2=Alternative word 2 generated by the predictor for the ASR word.

c. Alternative 3=the ASR word.

Neural corrector model 304 also receives audio encodings for audio encodings 110 that corresponds to the ASR word (e.g., from which the ASR word was generated), and alignment signals 220 that indicate the correspondence/alignment between the audio encoding and the ASR word. Neural corrector model 304 correlates the audio encoding against each of word choices 234 individually (e.g., against alternative 1 (alternative word 1), alternative 2 (alternative word 2), and alternative 3 (the ASR word)) to produce respective correspondence scores 310 (e.g., alt 1 score, alt 2 score, and alt 3 score). Neural corrector model 304 measures a level of correspondence (i.e., a correspondence level) between the audio encoding and each of word choices 234 based on the prior training of the neural corrector model, to produce correspondence scores 310. Essentially, correspondence scores 310 indicate how closely alternatives 1, 2, and 3 correspond to the audio encoding. Neural corrector model 304 provides correspondence scores 310 to selector 306 as a selector control signal.

Selector 306 also receives word choices 234 and selects one of word choices 234 (e.g., alternative word 1, alternative word 2, or the ASR word) as an output word based on correspondence scores 310, and provides the output word to corrected transcript 114. In other words, selector 306 passes a selected one of word choices 234 to corrected transcript 114 based on correspondence scores 310. In an example, selector 306 selects as the output word a word choice among word choices 234 that has a highest correspondence score among correspondence scores 310. Corrector 232 repeats the above-described operations for successive ASR words to produce successive output words.

Figure 4:
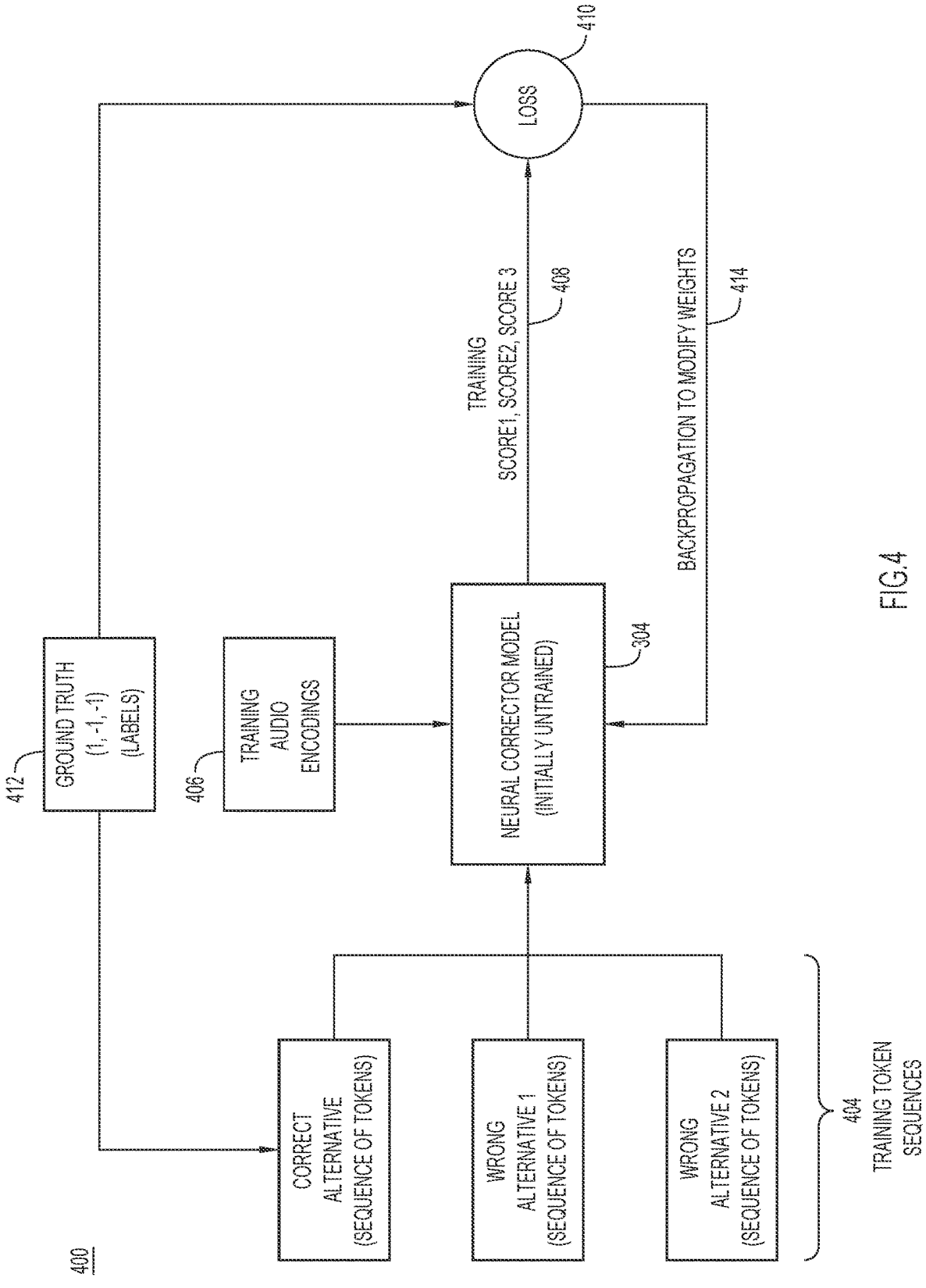
FIG. 4 is an illustration of example machine learning (ML) training of a neural corrector model of the corrector, according to an example embodiment.

FIG. 4 is an illustration of an example training method 400 (e.g., a machine learning training method) for training neural corrector model 304. Training method 400 transitions neural corrector model 304 from an initially untrained state at the start of training to a trained state at the end of training. Once trained, neural corrector model 304 operates in an inference mode/stage to perform the operations described in connection with FIGS. 1-3 and 5. Preprocessing operations generate a training data set from training input audio. The training data set includes training token sequences 404 and training audio encodings 406. Training token sequences 404 include (i) "correct" training token sequences that correspond to (i.e., that are generated based on) at least some of training audio encodings 406, and (ii) "incorrect" or "wrong" training token sequences that do not correspond to the training audio encodings (i.e., were not generated from the training audio encodings). In an example, a (training) three token sequence (i.e., a sequence of three tokens) may represent a training word. The preprocessing operations label the correct and incorrect training token sequences as correct and incorrect training sequences, as described below.

Training method 400 provides to neural corrector model 304 (in its untrained state) training token sequences 404 as labeled along with training audio encodings 406. In the example of FIG. 4, training token sequences 404 include a correct alternative (i.e., a correct token sequence), a wrong alternative 1 (i.e., a first incorrect token sequence), and a wrong alternative 2 (i.e., a second incorrect token sequence) with respect to training audio encodings. Neural corrector model 304 correlates each of training token sequences 404 against training audio encodings 406 to measure/determine a level of correspondence between the training token sequences and the training audio encoding, to produce respective ones of training correspondence scores 408 (e.g., training scores 1, 2, and 3 for the correct alternative, wrong alterative 1, and wrong alternative 2), and provides the same to a loss function 410.

Training method 400 further provides to loss function 410 "ground truth" scores 412 (which also serve as labels) corresponding to respective ones of training token sequences 404. In the example, ground truths=1/−1 respectively represent correct/incorrect training token sequences. Thus, in training token sequences 404, the correct alterative corresponds to ground truth 1 and wrong alternatives 1, 2 correspond to ground truths −1, −1. In a case in which there is uncertainty as to whether a token sequence is correct, but there is a suspicion that the token sequence is correct, the token sequence may be assigned a ground truth score of 0.5 or some other value between 0 and 1 based on confidence. Such a case may arise during the preprocessing stage of training when there is a chance that a human transcript has errors or an imperfect audio encoding-word alignment. This approach avoids discarding the word so as to maximize the use all available information.

Loss function 410 compares training correspondence scores 408 to corresponding ones of ground truth scores 412 to generate backpropagation signal 414 (which may generally represent a function of the difference between the correspondence scores and the corresponding ground truths), and provides the backpropagation signal to neural corrector model 304. Backpropagation signal 414 represents a measure of how close the training correspondence scores are to ground truth. Neural corrector model 304 modifies/trains internal machine learning weights (e.g., in convolutions layers) of the neural corrector model based on the backpropagation signal using gradient descent, for example. A goal of training is to train neural corrector model 304 to recognize correct alternatives and incorrect alternatives, and thereby produce correspondence scores that are as close to ground truth as possible, i.e., that accurately reflect ground truth.

During both inference and training operations, neural corrector model 304 determines whether a token sequence (which serves as a hypothesis) corresponds to an audio encoding. When the token sequence corresponds to the audio encoding, neural corrector model 304 produces a correspondence score=1 (or close to 1). When the token sequence does not correspond to the audio encoding, neural corrector model 304 produces a correspondence score=−1 (or close to −1). Depending on the level of correspondence between the token sequence and the audio encoding, the correspondence score may range from −1 (least correspondence) to 1 (highest correspondence).

FIG. 5 is a flowchart of an example method 500 of improving a previously generated ASR transcript to produce a corrected transcript. Method 500 may be implemented on one or more computer devices. The operations of method 500 are inference stage operations that are performed after various one of the processes/operations of method 500 have been trained, as described above.

At 502, method 500 receives a previously generated ASR text transcript of input audio. The ASR text transcript includes general vocabulary words. The text transcript may be generated by an ASR process that includes an audio encoder/encoding process that encoded the input audio into a sequence of audio encodings, and a decoder/decoder process that converted the sequence of audio encodings to a sequence of ASR words that correspond to the audio encodings. The ASR words may each include or be represented as one or more ASR tokens (i.e., as an ASR token sequences).

At 504, method 500 receives speech hints for OOV/non-standard words that are not included in the ASR text transcript. Method 500 generates alternative words (e.g., alternative token sequences) for an ASR word (e.g., an ASR token sequence) of the ASR words based on the speech hints. To do this, method 500 manipulates the ASR token sequence based on the speech hints to produce the alternative words. Such manipulation may include replacing the ASR token with a hint token from a speech hint, adding the hint token to the ASR token sequence (e.g., inserting the hint token), and/or deleting the ASR token from the ASR token sequence.

At 506, using a trained neural corrector model, method 500 correlates an audio encoding of the audio encodings that corresponds to the ASR word against the ASR word and each of the alternative words (collectively referred to as "word choices"), to produce correspondence scores that indicate how closely the audio encoding corresponds to each of the word choices (i.e. how likely it is that each word choice was generated from the audio encoding). Prior to performing the correlations, method 500 may align the audio encoding to the ASR word and the alternative words based on alignment signals provided from the ASR process.

In an example, the neural corrector model may be previously trained on training data to produce the correspondence scores during inference (after training) such that the correspondence scores indicate how closely the audio encodings correspond to the ASR word and each of the alternative words. For example, the neural corrector model may be previously trained on correlations of training audio encodings against training words labeled to indicate known correspondence or non-correspondence to the training audio encodings.

At 508, method 500 selects an output word among the word choices (i.e., the ASR word and the alternative words) based on the correspondence scores. Method 500 may select the ASR word or one of the alternative words that has the highest correspondence score.

At 510, method 500 provides the output word to the corrected transcript. Method 500 repeats 506-510 for successive ASR words to produce successive output words.

In summary embodiments presented herein employ a two stage pass to add speech hints from a list of speech hints to previously generated automatic speech recognition output. The first pass (the predictor) generates possible alternatives/suggestions based on the speech hints, and the second pass (the corrector) filters out incorrect suggestions from the first pass. The predictor acts on word pieces (tokens) in words of the output produced by the ASR. The predictor parses the tokens and decides if any combination of tokens can possibly be replaced by another combination of tokens that represent a speech hint from the list of speech hints.

The corrector decides which of the alternatives/choices returned by the predictor is/are correct, if any. The corrector uses the audio encodings returned by the ASR in generating the ASR output (transcript) to make the decision. The corrector employs a neural corrector model that is trained using training data, and is token based so that the corrector can generalize from general vocabulary words to OOV words. The corrector may not be trained on OOV words directly. Essentially, during training, the corrector learns correlations between the audio encodings and each token. The embodiments may provide a more accurate result than known methods, and offer one or more of the following advantages. The corrector supplements the main (original) ASR and is highly efficient because the corrector compares tokens but does not generate tokens, which means the corrector can be small in size and trained on limited data. In addition, these techniques operate after the original ASR and do not interfere with the original ASR, which can be trained and prepared separately. The embodiments can work with any type of original ASR model that produces audio encodings and output tokens. Since ASR output probabilities by the embodiments, optimal original ASR functionality is retained. Lastly, the predictor is flexible and can be used to adjust for any type of bias in the ASR outputs such as returning similar sounding or similarly spelled tokens compared to the actual tokens expected. The predictor can be adjusted according to each ASR.

Figure 6:
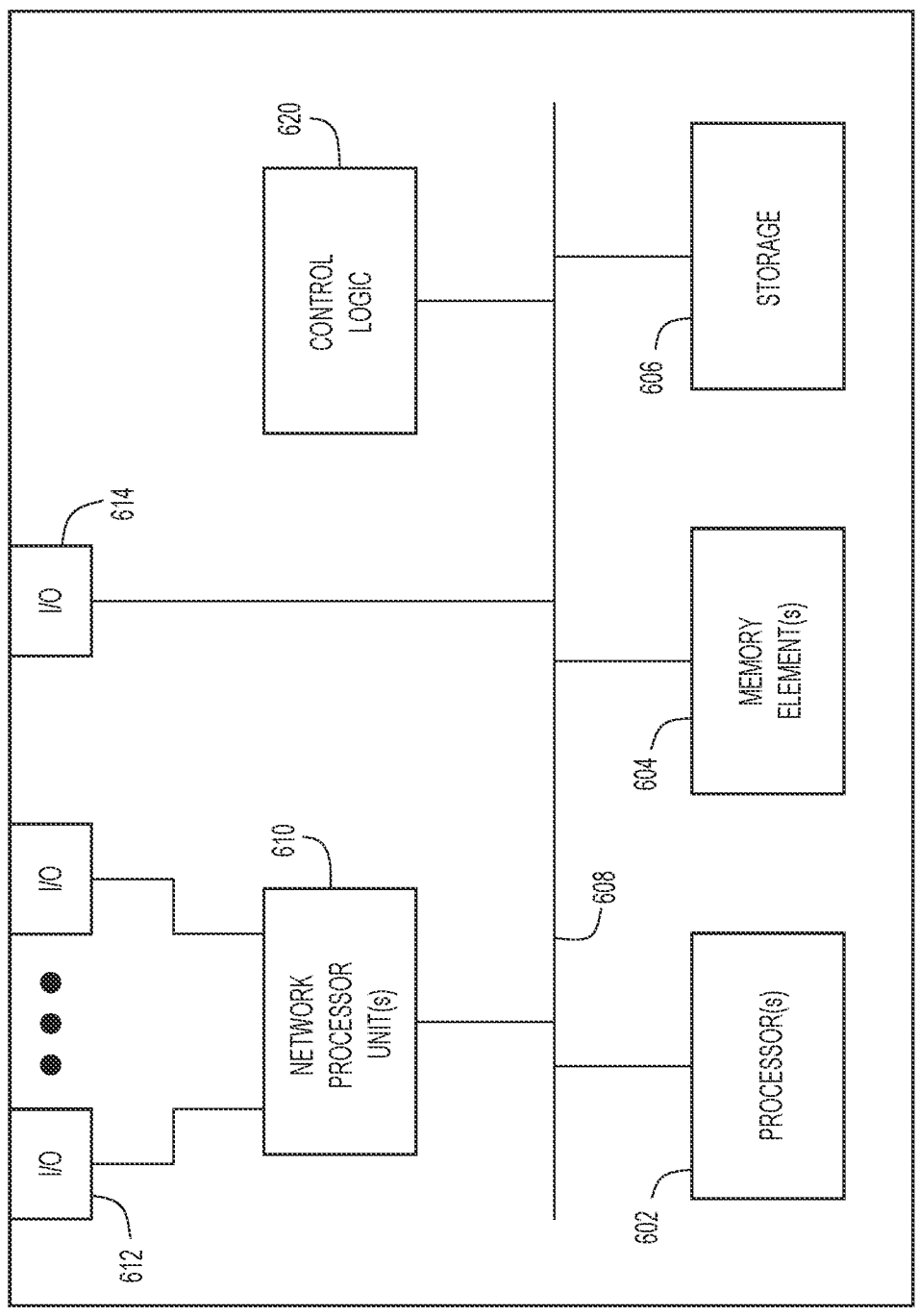
FIG. 6 illustrates a hardware block diagram of a computing device that may perform functions associated with operations discussed herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any entity/entities as discussed for the techniques depicted in connection with FIGS. 1-5 in order to perform operations of the various techniques discussed herein. For example, computing device may represent each of the components of ASR and predictor-corrector system 100 individually and/or collectively, including ASR system 102 and predictor-corrector system 104.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/ antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device;

interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In some aspects, the techniques described herein relate to a method including: receiving an automatic speech recognition (ASR) text transcript (ASR text transcript) generated by an ASR process that encoded input audio into audio encodings and converted the audio encodings to ASR words of the ASR text transcript that correspond to the audio encodings; receiving speech hints for non-standard words, and generating alternative words for an ASR word of the ASR words based on the speech hints; correlating an audio encoding of the audio encodings that corresponds to the ASR word against the ASR word and each of the alternative words, to produce correspondence scores; selecting an output word among the ASR word and the alternative words based on the correspondence scores; and providing the output word to a corrected transcript.

In summary, in some aspects, the techniques described herein relate to a method, wherein: the ASR word is represented by an ASR token sequence; generating includes generating the alternative words as alternative token sequences based on the speech hints; correlating includes correlating the audio encoding against the ASR token sequence and each of the alternative token sequences, to produce the correspondence scores; selecting includes selecting an output token sequence among the ASR token sequence and the alternative token sequences based on the correspondence scores; and providing includes providing the output token sequence as the output word in the corrected transcript.

In some aspects, the techniques described herein relate to a method, wherein: generating includes manipulating the ASR token sequence based on the speech hints to produce the alternative words.

In some aspects, the techniques described herein relate to a method, wherein manipulating includes one or more of: replacing an ASR token of the ASR token sequence with a hint token from a speech hint; adding the hint token to the ASR token sequence; and deleting the ASR token from the ASR token sequence.

In some aspects, the techniques described herein relate to a method, further including: prior to correlating, aligning the audio encoding corresponding to the ASR word.

In some aspects, the techniques described herein relate to a method, wherein: correlating includes correlating using a neural model previously trained on training data to produce the correspondence scores to indicate how closely the audio encodings correspond to the ASR word and each of the alternative words.

In some aspects, the techniques described herein relate to a method, wherein: the neural model was previously trained on correlations of training audio encodings against training words labeled to indicate correspondence or non-correspondence of the training words to the training audio encodings.

In some aspects, the techniques described herein relate to an apparatus including: a network input/output interface to communicate with a network; and a processor coupled to the network input/output interface and configured to perform: receiving an automatic speech recognition (ASR) text transcript (ASR text transcript) generated by an ASR process that encoded input audio into audio encodings and converted the audio encodings to ASR words of the ASR text transcript that correspond to the audio encodings; receiving speech hints for non-standard words, and generating alternative words for an ASR word of the ASR words based on the speech hints; correlating an audio encoding of the audio encodings that corresponds to the ASR word against the ASR word and each of the alternative words, to produce correspondence scores; selecting an output word among the ASR word and the alternative words based on the correspondence scores; and providing the output word to a corrected transcript.

In some aspects, the techniques described herein relate to an apparatus, wherein: the ASR word is represented by an ASR token sequence; the processor is configured to perform generating by generating the alternative words as alternative token sequences based on the speech hints; the processor is configured to perform correlating by correlating the audio encoding against the ASR token sequence and each of the alternative token sequences, to produce the correspondence scores; the processor is configured to perform selecting by selecting an output token sequence among the ASR token sequence and the alternative token sequences based on the correspondence scores; and the processor is configured to perform providing by providing the output token sequence as the output word in the corrected transcript.

In some aspects, the techniques described herein relate to an apparatus, wherein: the processor is configured to perform generating by manipulating the ASR token sequence based on the speech hints to produce the alternative words.

In some aspects, the techniques described herein relate to an apparatus, wherein the processor is configured to perform manipulating by one or more of: replacing an ASR token of the ASR token sequence with a hint token from a speech hint; adding the hint token to the ASR token sequence; and deleting the ASR token from the ASR token sequence.

In some aspects, the techniques described herein relate to an apparatus, wherein the processor is further configured to perform: prior to correlating, aligning the audio encoding corresponding to the ASR word.

In some aspects, the techniques described herein relate to an apparatus, wherein: the processor is configured to perform correlating by correlating using a neural model previously trained on training data to produce the correspondence scores to indicate how closely the audio encodings correspond to the ASR word and each of the alternative words.

In some aspects, the techniques described herein relate to an apparatus, wherein: the neural model was previously trained on correlations of training audio encodings against training words labeled to indicate correspondence or non-correspondence of the training words to the training audio encodings.

In some aspects, the techniques described herein relate to a non-transitory computer medium encoded with instructions that, when executed by a processor, cause the processor to perform: receiving an automatic speech recognition (ASR) text transcript (ASR text transcript) generated by an ASR process that encoded input audio into audio encodings and converted the audio encodings to ASR words of the ASR text transcript that correspond to the audio encodings; receiving speech hints for non-standard words, and generating alternative words for an ASR word of the ASR words based on the speech hints; correlating an audio encoding of the audio encodings that corresponds to the ASR word against the ASR word and each of the alternative words, to produce correspondence scores; selecting an output word among the ASR word and the alternative words based on the correspondence scores; and providing the output word to a corrected transcript.

In some aspects, the techniques described herein relate to a non-transitory computer medium, wherein: the ASR word is represented by an ASR token sequence; the instructions to cause the processor to perform generating include instructions to cause the processor to perform generating the alternative words as alternative token sequences based on the speech hints; the instructions to cause the processor to perform correlating include instructions to cause the processor to perform correlating the audio encoding against the ASR token sequence and each of the alternative token sequences, to produce the correspondence scores; the instructions to cause the processor to perform selecting include instructions to cause the processor to perform selecting an output token sequence among the ASR token sequence and the alternative token sequences based on the correspondence scores; and the instructions to cause the processor to perform providing include instructions to cause the processor to perform providing the output token sequence as the output word in the corrected transcript.

In some aspects, the techniques described herein relate to a non-transitory computer medium, wherein: the instructions to cause the processor to perform generating include instructions to cause the processor to perform manipulating the ASR token sequence based on the speech hints to produce the alternative words.

In some aspects, the techniques described herein relate to a non-transitory computer medium, wherein the instructions to cause the processor to perform manipulating include the instructions to cause the processor to perform one or more of: replacing an ASR token of the ASR token sequence with a hint token from a speech hint; adding the hint token to the ASR token sequence; and deleting the ASR token from the ASR token sequence.

In some aspects, the techniques described herein relate to a non-transitory computer medium, wherein: the instructions to cause the processor to perform correlating include instructions to cause the processor to perform correlating using a neural model previously trained on training data to produce the correspondence scores to indicate how closely the audio encodings correspond to the ASR word and each of the alternative words.

In some aspects, the techniques described herein relate to a non-transitory computer medium, wherein: the neural model was previously trained on correlations of training audio encodings against training words labeled to indicate correspondence or non-correspondence of the training words to the training audio encodings.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving an automatic speech recognition (ASR) text transcript (ASR text transcript) generated by an ASR process that encoded input audio into audio encodings and converted the audio encodings to ASR words of the ASR text transcript that correspond to the audio encodings;

receiving speech hints for non-standard words, and generating, for an ASR word of the ASR words that is represented as an ASR token sequence, alternative words as alternative token sequences based on the speech hints;

correlating an audio encoding of the audio encodings that corresponds to the ASR word against the ASR token sequence for the ASR word and each of the alternative token sequences for the alternative words, to produce correspondence scores;

selecting an output word among the ASR word and the alternative words by selecting an output token sequence among the ASR token sequence and the alternative token sequences based on the correspondence scores; and providing the output token sequence as the output word to a corrected transcript.

2. The method of claim 1, wherein:

the speech hints include out-of-vocabulary words that are not general vocabulary words.

3. The method of claim 1, wherein:

generating includes manipulating the ASR token sequence based on the speech hints to produce the alternative words.

4. The method of claim 1, wherein manipulating includes one or more of:

replacing an ASR token of the ASR token sequence with a hint token from a speech hint;

adding the hint token to the ASR token sequence; and deleting the ASR token from the ASR token sequence.

5. The method of claim 1, further comprising:

prior to correlating, aligning the audio encoding corresponding to the ASR word.

6. The method of claim 1, wherein:

correlating includes correlating using a neural model previously trained on training data to produce the correspondence scores to indicate how closely the audio encodings correspond to the ASR word and each of the alternative words.

7. The method of claim 6, wherein:

the neural model was previously trained on correlations of training audio encodings against training words labeled to indicate correspondence or non-correspondence of the training words to the training audio encodings.

8. An apparatus comprising:

a network input/output interface to communicate with a network; and a processor coupled to the network input/output interface and configured to perform:

receiving an automatic speech recognition (ASR) text transcript (ASR text transcript) generated by an ASR process that encoded input audio into audio encodings and converted the audio encodings to ASR words of the ASR text transcript that correspond to the audio encodings;

receiving speech hints for non-standard words, and generating, for an ASR word of the ASR words that is represented as an ASR token sequence, alternative words as alternative token sequences based on the speech hints;

correlating an audio encoding of the audio encodings that corresponds to the ASR word against the ASR token sequence for the ASR word and each of the alternative token sequences for the alternative words, to produce correspondence scores;

selecting an output word among the ASR word and the alternative words by selecting an output token sequence among the ASR token sequence and the alternative token sequences based on the correspondence scores; and providing the output token sequence as the output word to a corrected transcript.

9. The apparatus of claim 8, wherein:

the speech hints include out-of-vocabulary words that are not general vocabulary words.

10. The apparatus of claim 8, wherein:

the processor is configured to perform generating by manipulating the ASR token sequence based on the speech hints to produce the alternative words.

11. The apparatus of claim 8, wherein the processor is configured to perform manipulating by one or more of:

replacing an ASR token of the ASR token sequence with a hint token from a speech hint;

adding the hint token to the ASR token sequence; and deleting the ASR token from the ASR token sequence.

12. The apparatus of claim 8, wherein the processor is further configured to perform:

prior to correlating, aligning the audio encoding corresponding to the ASR word.

13. The apparatus of claim 8, wherein:

the processor is configured to perform correlating by correlating using a neural model previously trained on training data to produce the correspondence scores to indicate how closely the audio encodings correspond to the ASR word and each of the alternative words.

14. The apparatus of claim 13, wherein:

the neural model was previously trained on correlations of training audio encodings against training words labeled to indicate correspondence or non-correspondence of the training words to the training audio encodings.

15. A non-transitory computer medium encoded with instructions that, when executed by a processor, cause the processor to perform:

receiving an automatic speech recognition (ASR) text transcript (ASR text transcript) generated by an ASR process that encoded input audio into audio encodings and converted the audio encodings to ASR words of the ASR text transcript that correspond to the audio encodings;

receiving speech hints for non-standard words, and generating, for an ASR word of the ASR words that is represented as an ASR token sequence, alternative words as alternative token sequences based on the speech hints;

correlating an audio encoding of the audio encodings that corresponds to the ASR word against the ASR token sequence for the ASR word and each of the alternative token sequences for the alternative words, to produce correspondence scores;

selecting an output word among the ASR word and the alternative words by selecting an output token sequence among the ASR token sequence and the alternative token sequences based on the correspondence scores; and providing the output token sequence as the output word to a corrected transcript.

16. The non-transitory computer medium of claim 15, wherein:

the speech hints include out-of-vocabulary words that are not general vocabulary words.

17. The non-transitory computer medium of claim 15, wherein:

the instructions to cause the processor to perform generating include instructions to cause the processor to perform manipulating the ASR token sequence based on the speech hints to produce the alternative words.

18. The non-transitory computer medium of claim 15, wherein the instructions to cause the processor to perform manipulating include the instructions to cause the processor to perform one or more of:

replacing an ASR token of the ASR token sequence with a hint token from a speech hint;

adding the hint token to the ASR token sequence; and deleting the ASR token from the ASR token sequence.

19. The non-transitory computer medium of claim 15, wherein:

the instructions to cause the processor to perform correlating include instructions to cause the processor to perform correlating using a neural model previously trained on training data to produce the correspondence scores to indicate how closely the audio encodings correspond to the ASR word and each of the alternative words.

20. The non-transitory computer medium of claim 19, wherein:

the neural model was previously trained on correlations of training audio encodings against training words labeled to indicate correspondence or non-correspondence of the training words to the training audio encodings.

* * * * *